United States Patent [19]

Short

[11] Patent Number: 5,633,865

[45] Date of Patent: May 27, 1997

[54] APPARATUS FOR SELECTIVELY TRANSFERRING DATA PACKETS BETWEEN LOCAL AREA NETWORKS

[75] Inventor: Phillip Short, Monrovia, Calif.

[73] Assignee: Netvantage, El Segundo, Calif.

[21] Appl. No.: 688,236

[22] Filed: Jul. 29, 1996

Related U.S. Application Data

[63] Continuation of Ser. No. 414,927, Mar. 31, 1995, abandoned.

[51] Int. Cl.[6] .................. H04L 12/46; H04L 12/56; H04Q 11/04
[52] U.S. Cl. .................................. 370/412; 370/401
[58] Field of Search ................... 370/60, 60.1, 61, 370/79, 85.13, 85.14, 94.1, 94.2, 94.3; 340/825.06, 825.52; 395/200.02, 200.08, 200.13, 200.2, 500, 650, 800

[56] References Cited

U.S. PATENT DOCUMENTS

| | | | |
|---|---|---|---|
| 5,088,090 | 2/1992 | Yacoby | 370/85.13 |
| 5,136,580 | 8/1992 | Videlock et al. | 370/60 |
| 5,214,646 | 5/1993 | Yacoby | 370/85.13 |
| 5,245,606 | 9/1993 | DeSouza | 370/85.13 |
| 5,343,471 | 8/1994 | Cassagnol | 370/85.13 |
| 5,379,289 | 1/1995 | DeSouza et al. | 370/85.13 |
| 5,396,493 | 3/1995 | Sugiyama | 370/60 |

*Primary Examiner*—Alpus H. Hsu
*Attorney, Agent, or Firm*—Freilich, Hornbaker & Rosen

[57] ABSTRACT

A switching apparatus for selectively transferring data packets between a plurality of local area networks (LANs) at full-wire speed. A shared memory is used to store in buffers data packets received from one LAN prior to their transfer to another LAN under control of a block of control logic. The control logic maintains and updates sets of pointers which identify and control access to the buffers in shared memory. A single processor monitors these pointers and in response to a single source address table further updates these pointers to direct the control logic to discard or alternatively to transfer received data packets to other LANs.

22 Claims, 8 Drawing Sheets

100
APPARATUS FOR SELECTIVELY TRANSFERRING DATA PACKETS BETWEEN LOCAL AREA NETWORKS

This application is a continuation of U.S. patent application Ser. No. 08/414,927, filed Mar. 31, 1995, now abandoned.

BACKGROUND OF THE INVENTION

The present invention relates to apparatus for selectively transferring data packets between a plurality of commercially available local area networks (LANs), e.g., Ethernet, token ring, etc. Such commercially available apparatus, referred to as bridges or switches, typically use separate source address tables for identifying data sources on each LAN and then selectively transfer data packets between LANs depending upon the contents of the source address tables. Ideally, when a data packet is directed to a destination device on the same LAN, the data packet is not transferred to any of the other LANs and only when the destination device is known to be located on another LAN or when the location of the destination device is not known are data packets transferred to another LAN. Thus, data packet traffic is ideally limited to only the required LANs.

Many such commercially available switches attempt to maintain full-wire speed, the ability to transfer data packets between any two discrete LANs without any speed restrictions, e.g., lost or dropped data packets. Additionally, many switches, commonly described as cut through switches, attempt to minimize the time delay between starting to receive a data packet on a first LAN and starting to retransmit that data packet on a second LAN. However, if transmission starts before reception is completed, the possibility exists that an invalid data packet, e.g., a data packet with CRC errors, will then be transferred only to be to discarded by all of the devices on that LAN. When both of these design restrictions are concurrently applied to a switch, the potential architectures for such apparatus is restricted, increasing complexity and costs.

U.S. Patents directed to apparatus for switching or bridging LANs include 4,627,052; 4,715,030; 4,737,953; 4,922,503; and 5,136,580.

SUMMARY OF THE INVENTION

The present invention relates to apparatus for selectively transferring data packets between a plurality of local area networks (LANs), e.g., Ethernet, token ring, etc. Embodiments of the present invention receive data packets into a shared memory under control of a block of control logic and then a single processor decides according to a single source address table whether to discard or to transfer each received data packet. When the processor decides to transfer a data packet to a LAN, it instructs the block of control logic to control the transfer. Due to this structure, a single processor can control the flow of data packets between a plurality of LANs, each operating at full-wire speed.

In accordance with a preferred embodiment, a switching apparatus for selectively bidirectionally transferring data packets between a plurality of local area networks (LANs) wherein said data packets identify source and destination addresses, is primarily comprised of (1) a plurality of media access controllers (MACs) each coupled to a discrete LAN for receiving and buffering a portion of data packets on each said LAN, (2) a shared memory comprised of a plurality of fixed-sized buffers adapted for storing said data packets from each said LAN, (3) control logic for allocating at least one buffer to each received data packet, fetching each portion of each said received and buffered data packet and storing each said portion, (4) a single source address table for associating said data source addresses with each said LAN, and (5) a single processor for forming said source address table in response to a single receive signal from said control logic and directing said control logic to discard or alternatively to transfer each stored data packet to a different LAN using an associated MAC according to the contents of said source address table.

In accordance with a further aspect of a preferred embodiment, each said buffer has a predefined length smaller than a maximum data packet size such that a plurality of said buffers are required to store a data packet having said maximum data packet size and said control logic allocates one or more of said buffers to each data packet and additionally comprises means to transfer a selected received data packet stored in a plurality of said buffers to a selected one of said MACs.

Additionally, preferred embodiments use a plurality of sets of commonly accessible pointers within said control logic to control access to said buffers from said processor and said control logic.

The novel features of the invention are set forth with particularity in the appended claims. The invention will be best understood from the following description when read in conjunction with the accompanying drawings.

DESCRIPTION OF THE PREFERRED EMBODIMENTS

The present invention relates to apparatus for selectively transferring data packets between a plurality of local area networks (LANs), e.g., Ethernet, token ring, etc. Embodiments of the present invention preferably receive data packets into a common block of memory, i.e., shared memory, under control of a block of control logic and then a single processor decides according to a single source address table common to the plurality of LANs whether to discard or to transfer each received data packet. When the processor decides to transfer a data packet to a LAN, it instructs the block of control logic to control the transfer. Due to this structure, a single processor can control the flow of data packets between a plurality of LANs, each operating at full-wire speed.

Figure 1:
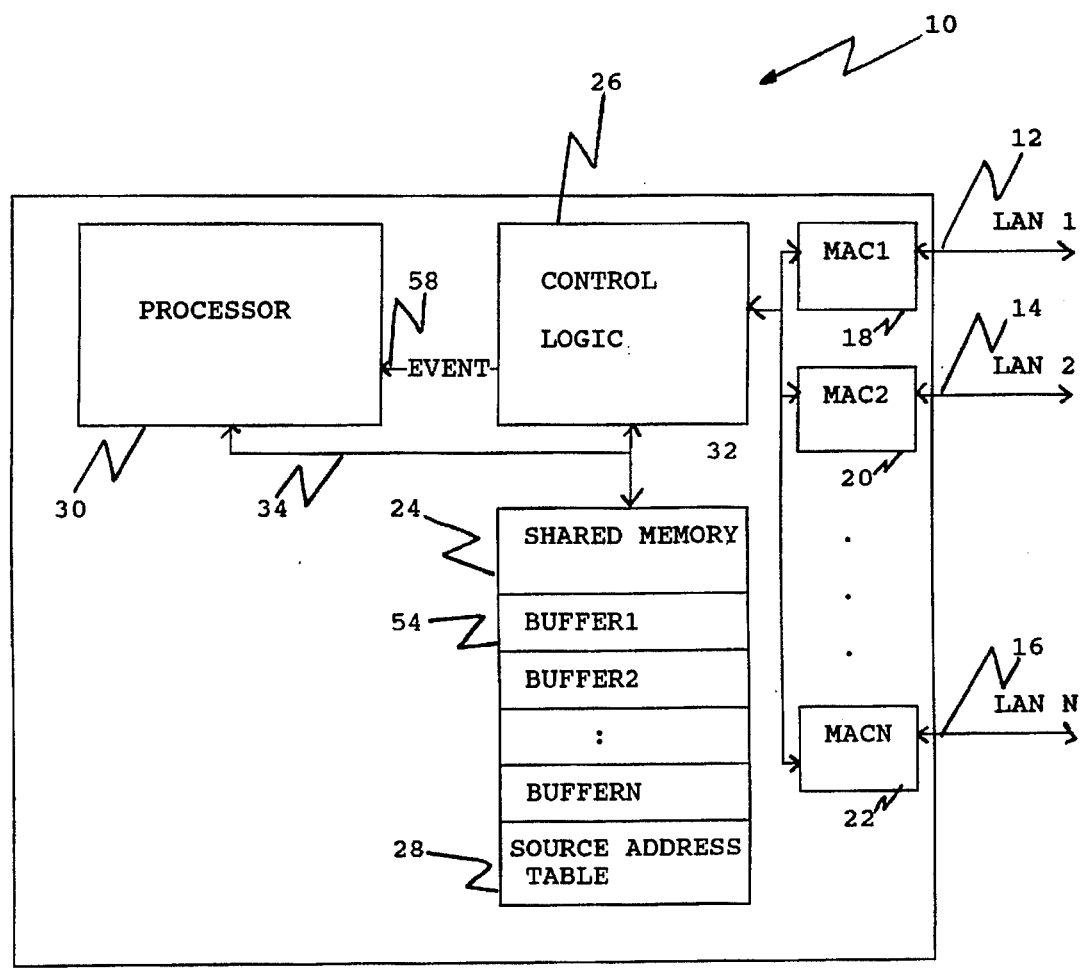
FIG. 1 comprises a functional block diagram of a preferred apparatus for selectively transferring data packets between a plurality of local area networks (LANs)

FIG. 1 shows a functional block diagram of a preferred apparatus 10, commonly known as a switch or a bridge, for selectively transferring data packets between a plurality of local area networks (LANs) 12, 14, and 16 according to data contained within each data packet (described further below). The switch apparatus 10 is primarily comprised of (1) a plurality of media access controllers (MACs) 18, 20, 22 corresponding to each LAN 12, 14, 16 for bidirectionally buffering data packets, (2) a shared memory 24 for storing received data packets prior to transferring to another LAN, (3) a block of control logic 26 for controlling the flow of data packets between the MACs 18, 20, 22 and the shared memory 24, (4) a single source address table 28 containing data for designating the identity of each known device coupled to each LAN, and (5) a single processor 30 for directing the control logic 26 to alternatively transfer or discard each received data packet in response to the data contained in each received data packet and the source address table 28. (In FIG. 1, the source address table 28 is shown as a portion of the shared memory 24. This design choice permits a common block of memory, e.g., 2 MEG of DRAM, to store both received data packets and the source address table and is not considered to be a limitation of the present invention.) Each media access controller (MAC) contains control logic that performs the function of buffering the reception and/or transmission of data packets to a LAN, e.g., an Ethernet LAN. MACs 18, 20, 22 are coupled to the control logic 26 via a MAC bus 32 and it is the control logic 26 which controls reception and directs data between the MACs 18, 20, 22 and the shared memory 24. The shared memory 24 is alternately accessible to both the processor 30 and the control logic 26 via a shared memory bus 34 which couples the shared memory 24 to the control logic 26.

By subdividing tasks between the processor 30, the control logic 26 and the MACs 18, 20 and 22, embodiments of the present invention can respond to data packets received on a plurality of LANs at full-wire speed. The basic functioning of each section of the switch apparatus 10 can best be described in reference to FIG. 2, an exemplary top level flow chart, in conjunction with FIG. 3, a diagram of an exemplary data packet 36 originating from a device on $LAN_1$ 12 that is directed to a device on $LAN_2$ 14.

Figure 3:
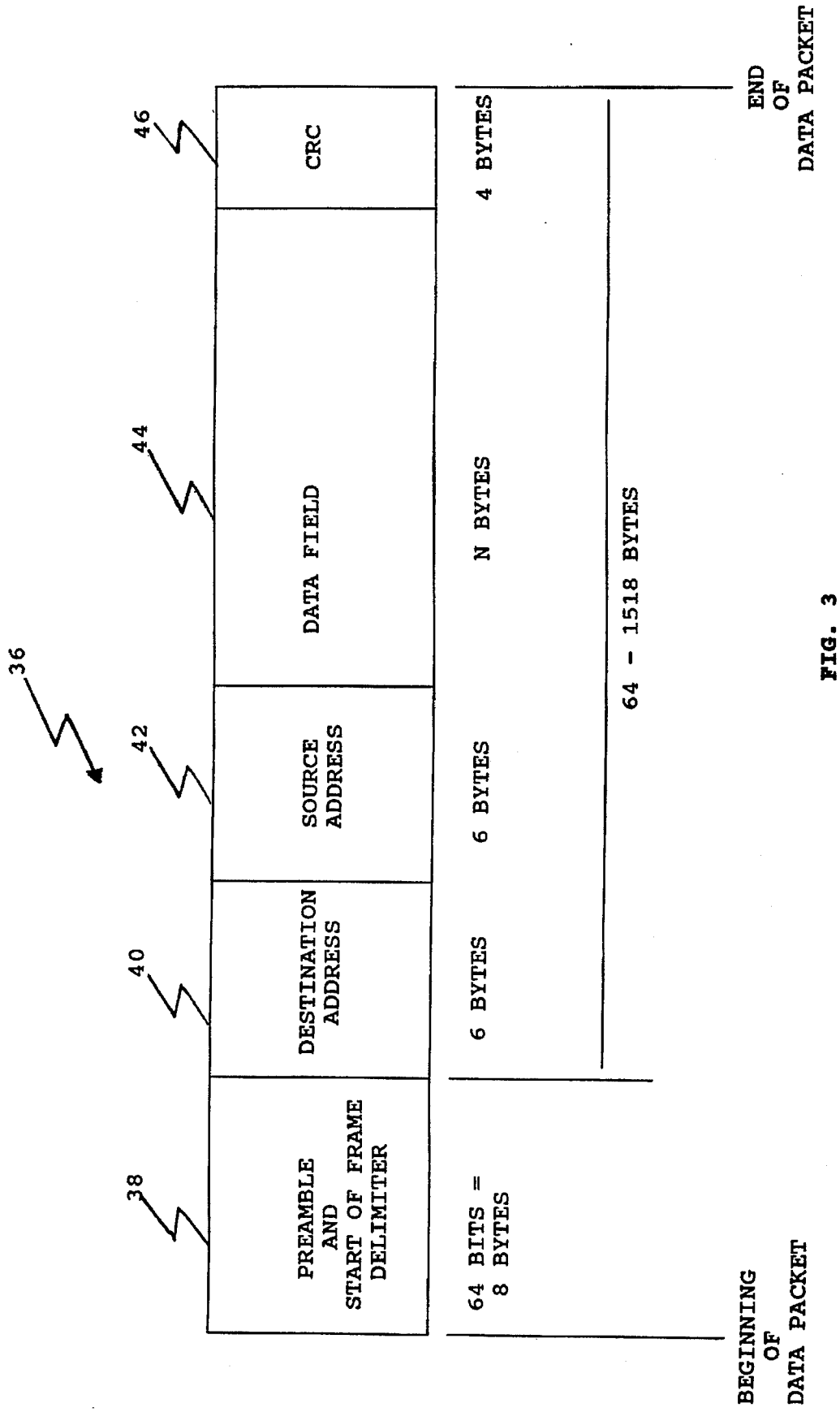
FIG. 3 shows the basic format of a data packet transferred by the present invention.

FIG. 3 shows the basic structure of the exemplary data packet 36 comprised of (1) a preamble 38 for designating the beginning of the data packet 36, (2) a destination address 40 for identifying a destination device present on a destination LAN, i.e., $LAN_2$ 14, (3) a source address 42 for identifying an originating device present on a source LAN, i.e., $LAN_1$ 12, (4) a data field 44 containing the information content of the data packet 36, and (5) a CRC field 46 for performing an integrity check on the contents of the data packet 36 and signifying the end of the data packet. The overall length of the data packet 36 (absent the preamble 38) is variable between a minimum length of 64 bytes and a maximum length of 1518 bytes.

Figure 2:
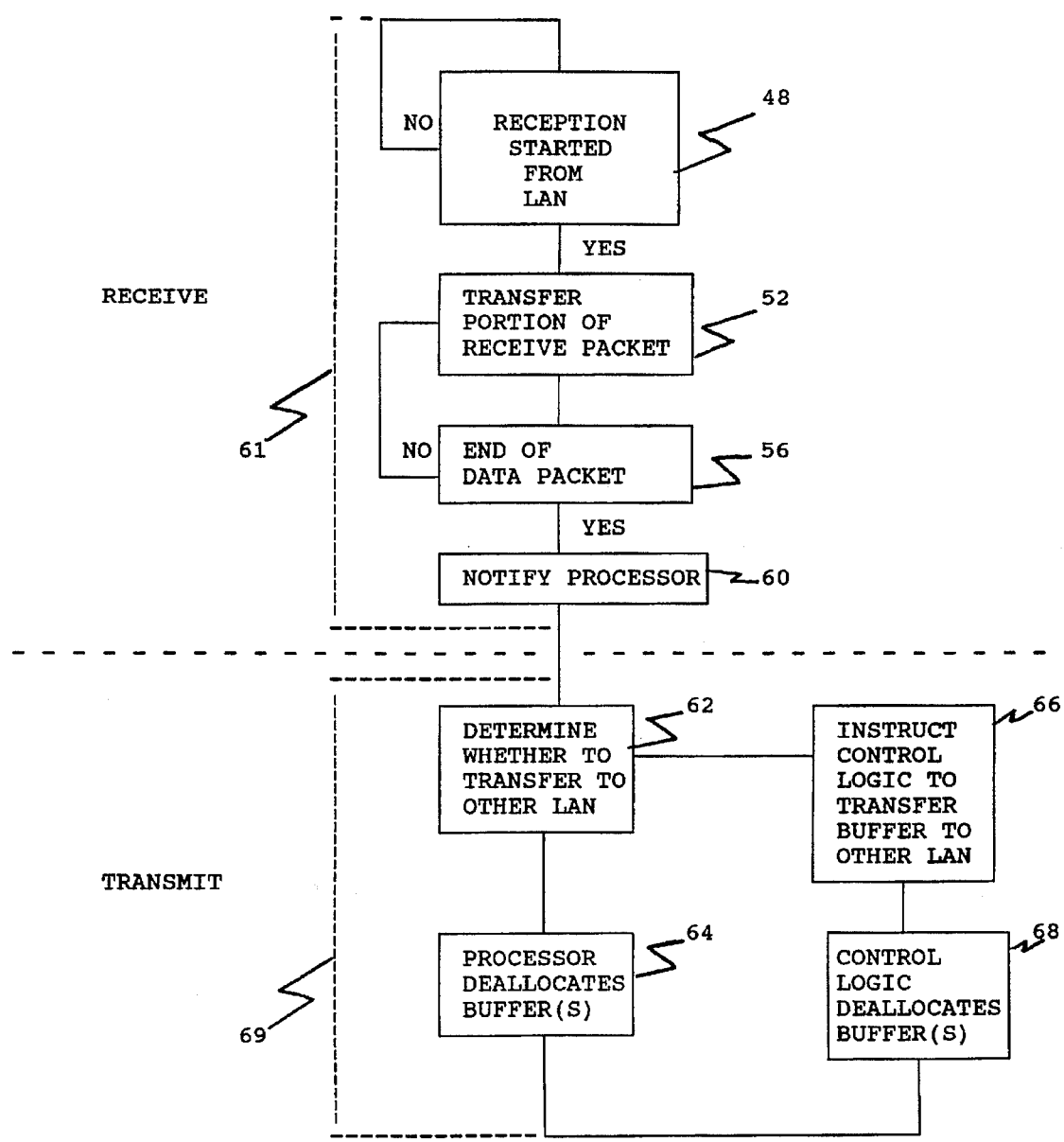
FIG. 2 is an exemplary top level flow chart showing the basic receive and transmit processing for the present invention.

FIG. 2 shows the basic receive and transmit tasks for one of a plurality of LAN channels of the present invention. In embodiments of the present invention, the receive and transmit tasks for a plurality of channels all operate essentially concurrently. The receive task starts in block 48 as the reception of the data packet 36, transmitted from an external device on $LAN_1$ 12, begins under control of $MAC_1$ 18. The $MAC_1$ 18 stores a portion of the data packet in its internal buffer and then signals the control logic 26 via the MAC bus 32 that a portion of the data packet 36 is available. In block 52, the control logic 26 then uses DMA control logic (described further below), i.e., a multichannel DMA controller, within the control logic 26 to transfer a portion of the data packet 36 to an allocated fixed-size buffer 54 within the shared memory 24. When the transmission of the data packet 36 is completed, as tested in block 56 and noted by the receipt of the CRC field 46, the $MAC_1$ 18 notifies the control logic 26 of the end of the data packet 36 along with associated status information. Following storing the end of the data packet 36 and its associated status information in the allocated buffer 54, the control logic 26 first notifies the processor 30 of the existence of the data packet 36 by presenting an event interrupt signal 58 in block 60.

After each data packet is received, other data packets can be received as noted by dashed line 61, into additional buffers in the shared memory 24 which essentially form a FIFO structure for storing a plurality of additional data packets. In its simplest case, e.g., a data packet of 64 bytes, a received data packet can be stored in a single buffer (actually, a portion of a packet descriptor as described further below). Buffers preferably have a predetermined fixed length, e.g., 512 bytes, that is smaller than a maximum sized data packet, e.g., 1518 bytes. Thus, to accommodate larger sized data packets, the control logic 26 automatically allocates additional buffers as needed. By only allocating buffers as needed, the maximum number of data packets than can be temporarily stored in the FIFO structure in a fixed sized, e.g., 2 MEG, shared memory 24 is maximized.

Embodiments of the present invention are commonly referred to as a store and forward systems. As such, the data packet 36 is not forwarded until it has been completely and successfully received. Such systems avoid unnecessary LAN traffic, e.g., transferring data packets with CRC errors. The receive task for the processor 30 commences in block 62 by determining whether the data packet 36 is valid according to its associated status information. If the data packet 36 is invalid, e.g., the CRC field 46 does not correspond to the data packet 36, the data packet 36 is discarded in block 64 by deallocating the buffer 54 from the shared memory 24, clearing the event interrupt signal 58, and making the buffer 54 available for storing subsequent data packets. If the data packet is valid, the destination address 40 within the data packet 36 is compared to the contents of the source address table 28 to determine whether to forward the data packet. This determination is done according to IEEE 802.1(d) in a manner well known to one of ordinary skill in the art. In summary, if a destination device is on the same LAN, i.e., $LAN_1$ 12, the contents of the buffer 54 are discarded in block 64 as previously discussed. If a destination device is designated in the source address table 28 as being located on another LAN, the process continues in block 66 by transferring the data packet from the buffer, e.g., 54, to a destination LAN, e.g., $LAN_2$ 14. However, if the location of a destination device is unknown, all of the remaining LANs, i.e., $LAN_2$ 14, $LAN_N$ 16, etc., are sent, i.e., flooded with, copies of the data packet. Embodiments of the present invention preferably automatically add entries to the source address table 28 under control of the processor 30 as each new source address 42 / LAN combination is identified. Thereafter, received data packets can be directed to only the proper LAN without requiring flooding. Alternatively, entries can be directly made into the source address table by a user via the contents of a data packet or via local input to the processor 30, e.g., via an RS-232 interfaced terminal.

In this example, the processor 30 determines from the contents of the source address table 28 that the data packet is to be transferred to $LAN_2$ 14. The processor 30 directs the control logic 26 in block 66 to commence transferring the data packet 36 from within buffer 54 to the $MAC_2$ 14 using DMA control logic within the control logic 26. At the completion of the transfer across $LAN_2$ 14, the control logic 26 is notified via the MAC bus 32 and the control logic 26 then deallocates the buffer 54 in block 68. Following deallocating one or more buffers in blocks 64 or 68, additional buffered transmit tasks can commence as indicated by dashed line 69.

While FIG. 2 only explicitly shows two essentially concurrent tasks, a receive and a transmit task, it should be clear to one of ordinary skill in the art that embodiments of the present invention comprise a multi-channel multi-tasking system that process portions of each receive and transmit task for each channel present in a particular embodiment. For example, eight separate receive channels and eight separate transmit channels corresponding to eight discrete LANs are monitored on a time shared basis in a currently manufactured embodiment of the present invention.

Figure 4:
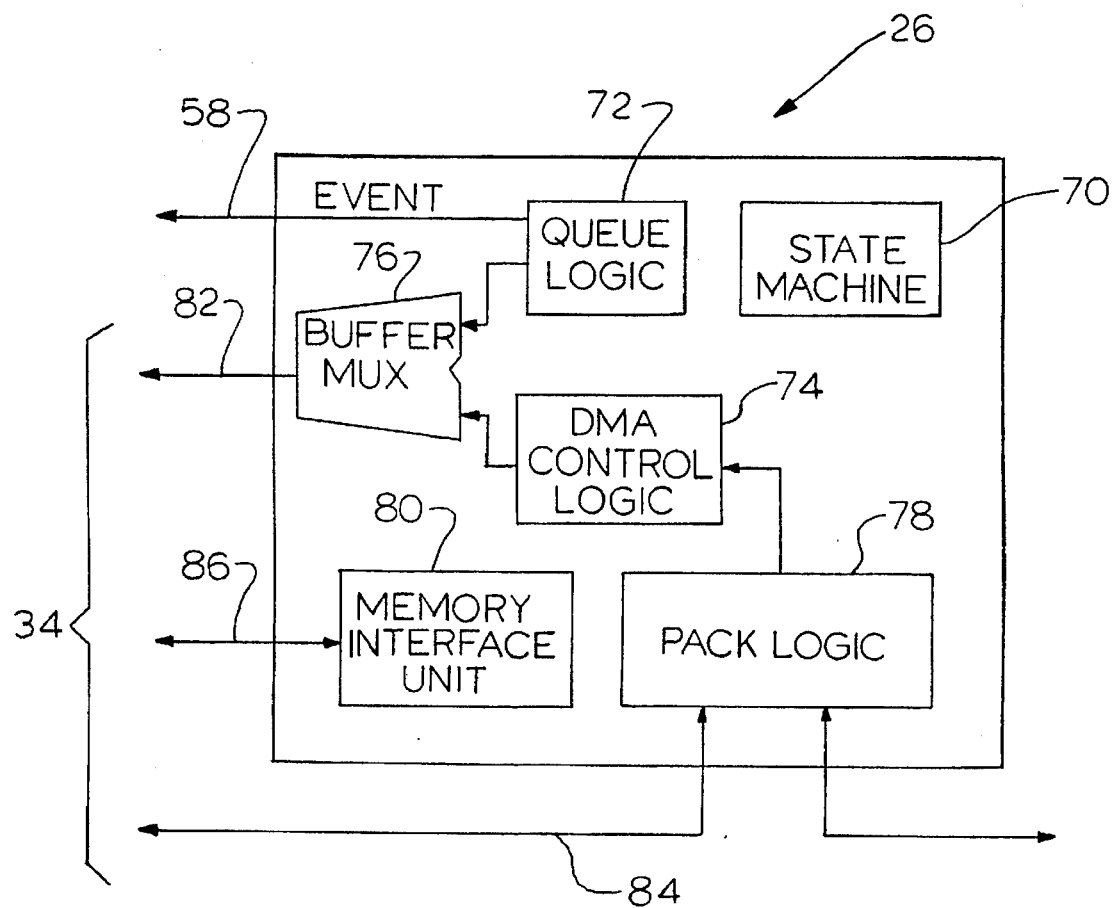
FIG. 4 shows a functional block diagram of the components comprising the control logic of FIG. 1.

FIG. 4 shows a function block diagram of the control logic 26 of FIG. 1, primarily comprised of (1) a state machine 70, (2) queue logic 72, (3) DMA control logic 74, (4) a buffer/mux 76, (5) pack logic 78, and (6) a memory interface unit 80. As previously described, the function of the control logic 26 is to control the bidirectional transfer of data from the LANs 12, 14, 16 via the MACs 18, 20, 22 to the shared memory 24. The shared memory 24 is alternatively accessed from the control logic 26 and the processor 30 via the shared memory bus 34.

The shared memory bus 34 is primarily comprised of an address bus 82, a data bus 84 and a control bus 86. The basic function of the memory interface unit 80 is to emulate processor control signals using the control bus 86 when the control logic 26 is accessing the shared memory 24. Additionally, it interfaces to bus arbitration logic (not shown) in the processor 30 by generating a HLD (hold) signal and responding to a HLDA (hold acknowledge) signal from the processor 30 which grants the control logic 26 access to the shared memory 24. The basic arbitration process proceeds as follows. Initially, the processor 30 has access to the shared memory bus 34. When required, as described further below, the control logic 26 requests access to the shared memory bus 34 via the memory interface unit 80. The memory interface unit 80 issues the HLD signal to the processor 30 via the control bus 86. In response, at the completion of the current memory cycle, the processor 30 issues the HLDA signal via the control bus 86 to the memory interface unit 80 and relinquishes control of the address and control busses 82, 84. The control logic 26 then takes control of the address and control busses 82, 84, thus accessing the shared memory 24. After completing its access to the shared memory 24, the control logic 26 instructs the memory interface unit 80 to relinquish control of the shared memory 24 by dropping the HLD signal to the processor 30.

As will be discussed further below, embodiments of the present invention access sections of the shared memory 24 without requiring semaphore or other time consuming operations, sometimes used in prior art systems to avoid incomplete status or other information being read from a shared memory. In embodiments of the present invention, a fixed length data quantity, e.g., 64 bits, is used as to represent a pointer/status value which is modified during a memory cycle, e.g., an atomic operation. Both the processor 30 and the control logic 26 via the queue logic 72 are configured to access the shared memory 24 using the same fixed length data quantities.

In an exemplary embodiment, the processor 30 is an Intel 80960CA operating a clock rate of 25 MHz, using a burst access mode for accessing these 64-bit pointer/status quantities. Thus, for these pointer/status accesses, the processor 30 uses a memory cycle to burst access two 32-bit data quantities, i.e., 64 bits, per atomic operation. Similarly, accesses to these 64-bit pointer/status quantities from the control logic 26 are also done in 64 bit bursts. In this same exemplary embodiment, each MAC is an AMD 79C940 Media Access Controller for Ethernet (MACE) operating in a burst mode of eight 16-bit data quantities, i.e., 128 bits, per DMA cycle. While the clock rate of the MACE is also 25 MHz, it requires two clocks for each data transfer and thus it has an effective clock rate of 12.5 MHz. This apparent incompatibility is resolved in this exemplary embodiment by having the pack logic 78 buffer the 128 bit bursts from the MACE at its effective clock rate of 12.5 MHz and then exchange its buffered data at 25 MHz in a similar manner to the processor 30.

Figure 5:
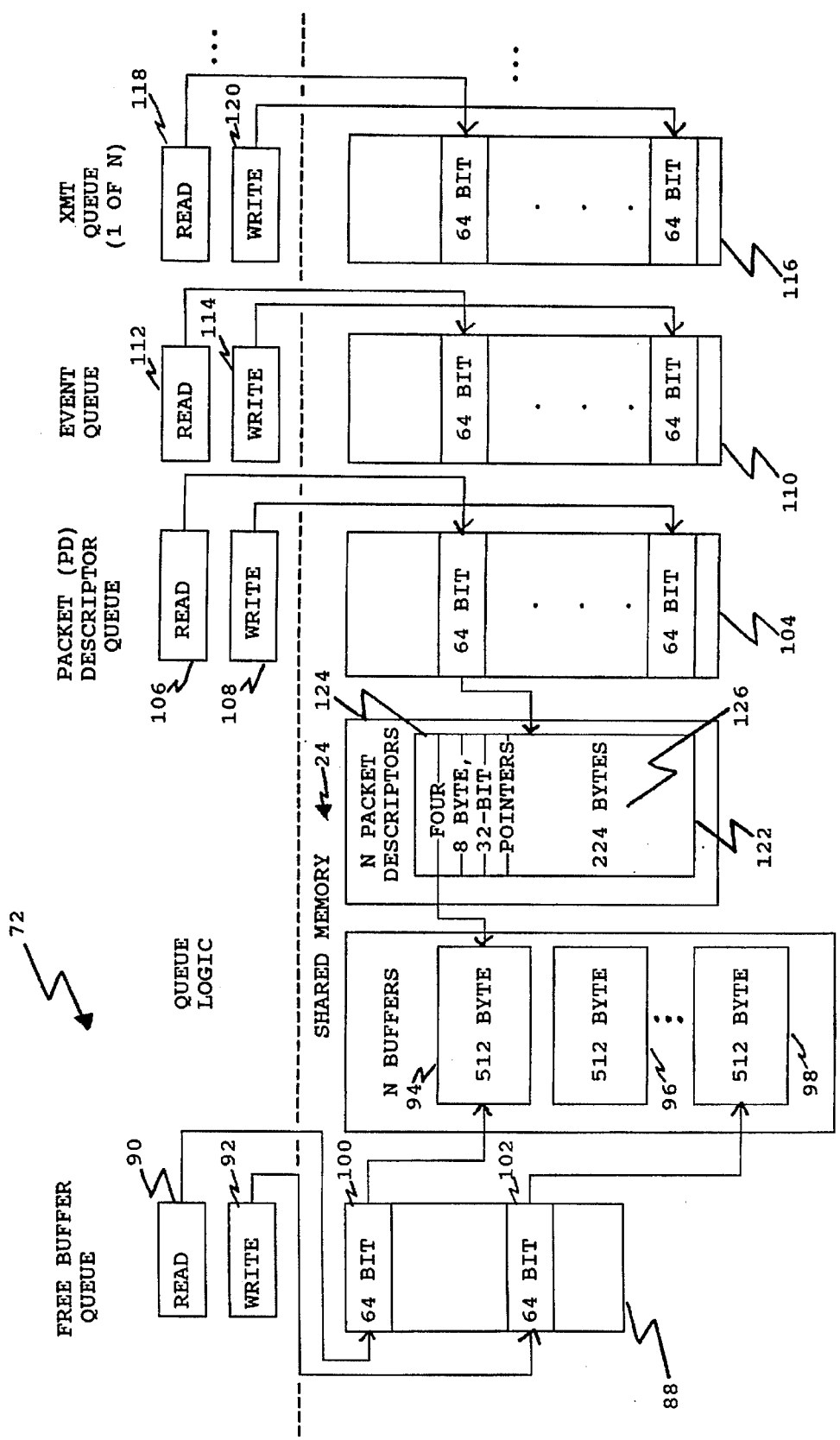
FIG. 5 shows a functional block diagram of the queue logic which forms a portion of the control logic of FIG. 1.

A top level description of the basic operation of the state machine 70 has previously been given in reference to FIG. 2. In order to further understand the details of the operations of the state machine, it is first necessary to understand the structure of the queue logic 72, as shown in FIG. 5. The queue logic 72 within the control logic 26 forms a plurality of queues comprised of pairs of read and write pointers which reference sections of the shared memory 24 forming FIFO (first-in, first-out) lists of pointer/status values which point to buffers and status stored within the shared memory 24.

The basic functions of these queues are as follows:

Free buffer—Designates the starting addresses of all of the currently available buffers.

Packet descriptor—Designates the buffers and status information corresponding to each received data packet.

Event—Designates each completed event, e.g., a received or transmitted data packet. Entering values in the event queue also generates the event interrupt signal 58. The processor 30 can alternatively respond to the event interrupt signal 58 or directly request a pointer to the next new event.

XMT—Designates packet descriptors which identify data packets that are to be transferred to another LAN.

Exemplary of this queue structure is the free buffer queue 88 which is comprised of a read pointer 90 and a write pointer 92 which point to a predefined section of the shared memory 24. As part of initialization of the switch apparatus 10, a plurality of fixed length queues, e.g., the free buffer queue 88, and fixed length buffers, e.g., 94, 96, 98 are allocated from within the shared memory 24. Within the free buffer queue 88, fixed length values, e.g., 64-bit values which include 32-bit pointer and status values, are generated pointing to the available buffers, e.g., 94, 96, 98. The read pointer 90 is initialized to point to a first buffer pointer 100 which points to a first available buffer, e.g., buffer 94, while the write pointer 92 is initialized to point to a second buffer pointer 102 which points to a last available buffer, e.g., buffer 98. As each buffer is allocated the read pointer 90 is automatically incremented by the queue logic 72. Similarly, as each buffer is deallocated, a new buffer pointer is added to the free buffer queue 88, past the buffer pointer pointed to by the write pointer 92 and the write pointer 92 is automatically incremented.

The read and write pointers 90, 92 preferably are of a lower bit resolution than the address range of the shared memory. In an exemplary embodiment, the read and write pointers 90, 92 are 11 bits, allowing $2^{11}$, i.e., 2048, entries in the free buffer queue 88. Before referencing the free buffer queue 88, the queue logic 72 automatically adds a plurality of "0" LSBs, e.g., three, to designate an eight byte (64 bit) pointer value and predetermined MSBs to select the starting location of the free buffer queue 88 within the shared memory 24. When the read and write pointers 90, 92 are incremented from a maximum value, e.g., 11111111111, which points to the last possible position in the free buffer queue 88, these pointers automatically wrap around to the lowest possible value, e.g., 00000000000, and thus point to the first possible position in the free buffer queue 88.

A similar structure is used for a packet descriptor queue 104 within the shared memory 24, pointed to by read and write pointers 106 and 108 within the queue logic 72, an event queue 110 within the shared memory 24, pointed to by read and write pointers 112 and 114 within the queue logic 72 and a plurality of XMT (transmit) queues, e.g., 116, one for each LAN, within the shared memory 24 and pointed to by read and write pointers 118 and 120 within the queue logic 72.

The pointers in program descriptor queue 104, point to a plurality of program descriptors. In an exemplary 256 byte packet descriptor 122, a first section 124 is comprised of a plurality of pointer/status values, e.g., 64 bits each, which point as needed to allocated buffers for a received data packet. The second section 126 of this exemplary packet descriptor 122 is used to store the first portion of the received data packet. In this implementation, a minimum size data packet of 64 bytes can be wholly stored within the packet descriptor 122, a type of buffer, without requiring any additional buffers. As needed, additional buffers are allocated and pointers are stored within this first section 124 of the packet descriptor 122 to designate these additional buffers.

The queue logic forms a portion of an interface between the shared memory 24 and the state machine 70 and the processor 30. For example, should the processor 30 desire to allocate a buffer pointed to by the free buffer queue 88, the processor 30 would reference a memory address corresponding to the read pointer 90 and the queue logic 72 would then form an address through the buffer/mux 76 and directly return the value contained in the buffer pointer pointed to by the read pointer 90, e.g., buffer pointer 100, to the processor 30. In some cases, a queue will have no entries, e.g., the event queue 110 when no data packets have been received. In such a case, the queue logic 72 automatically recognizes that the read and write pointers 112 and 114 contain identical values and instead of a buffer pointer it returns a unique value, e.g., a value with its MSB set to a "0" instead of "1", to the processor 30 to signal the absence of queue entries.

Figure 6:
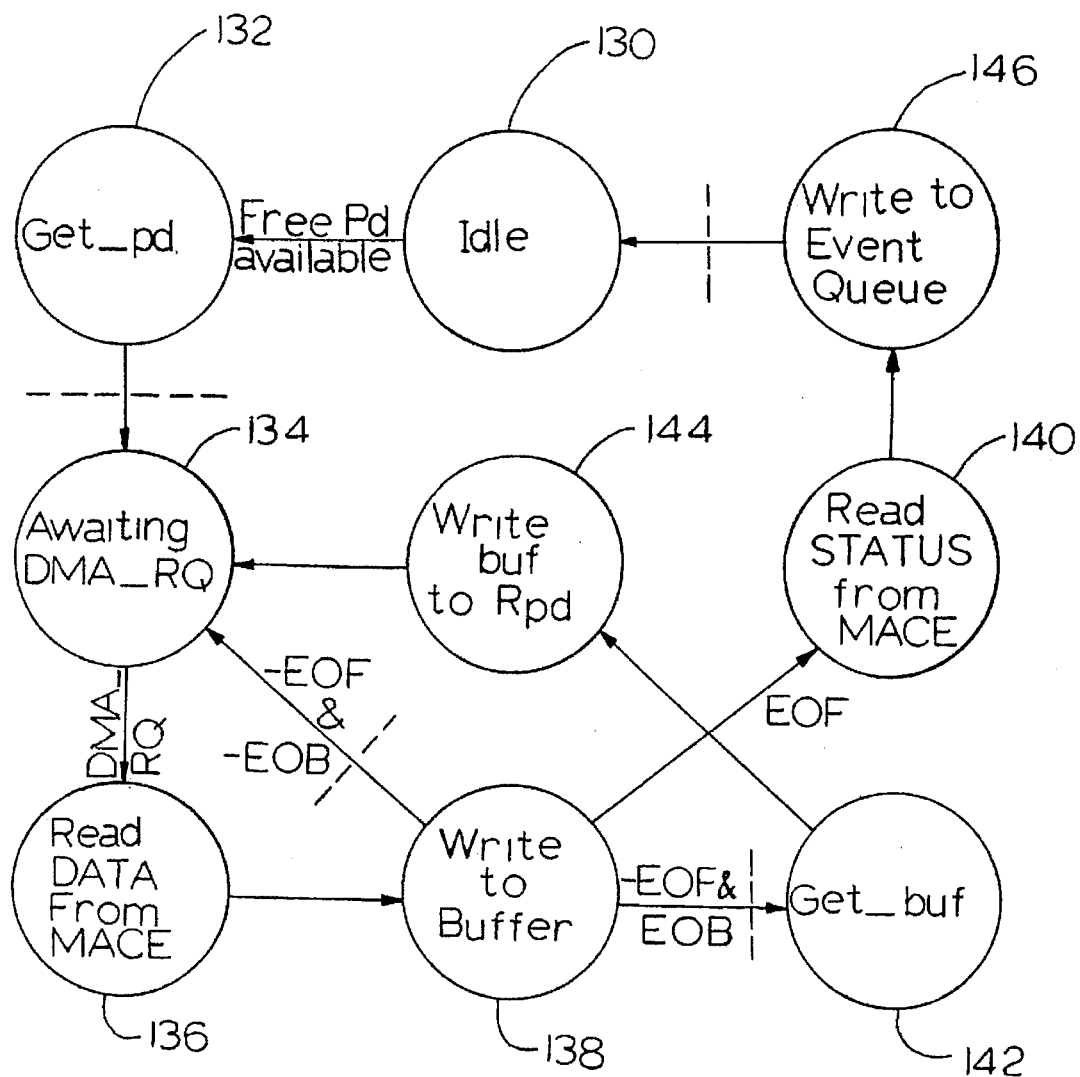
FIG. 6 shows a flow chart of the receive task which uses the FIFO queues of the present invention.
Figure 7:
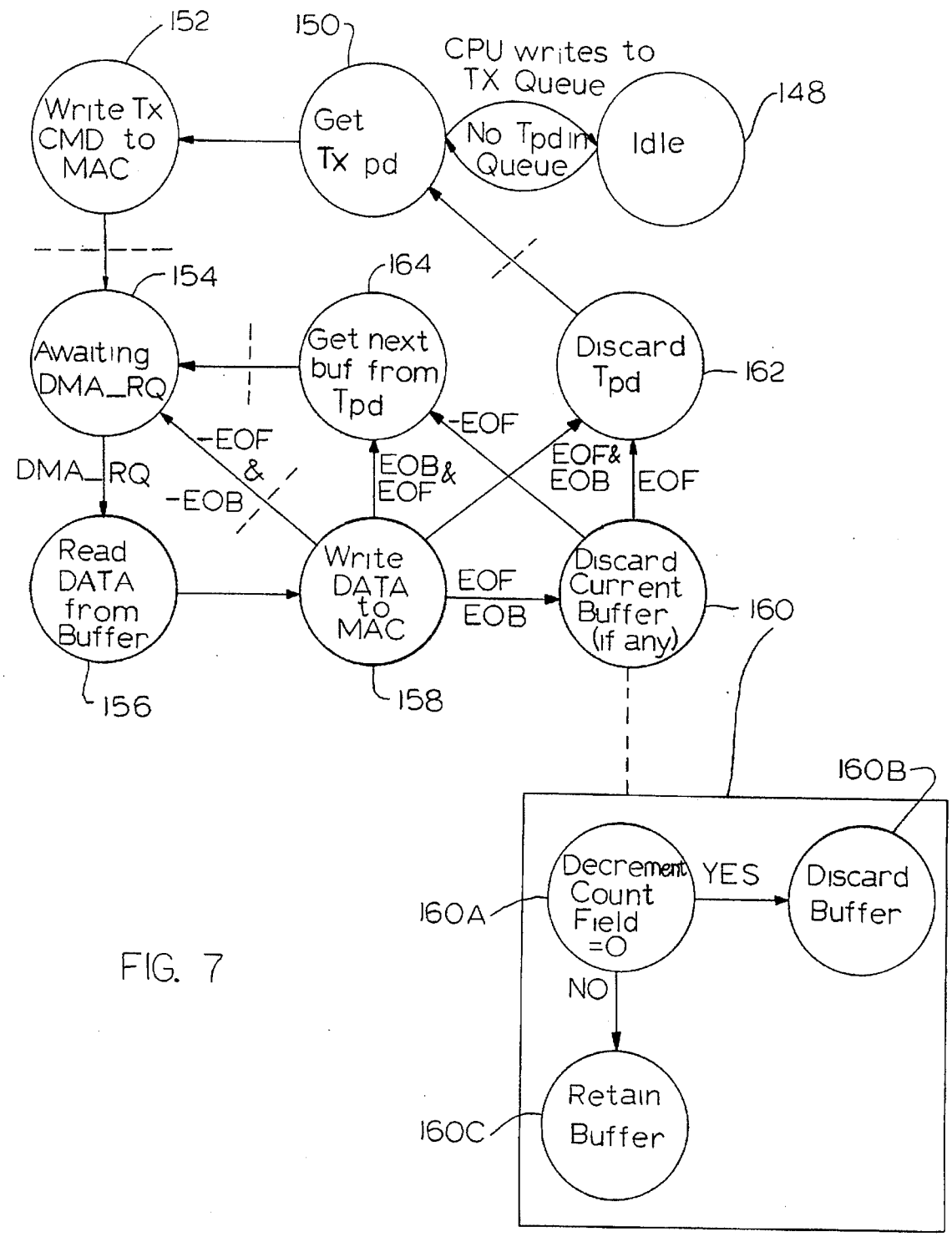
FIG. 7 shows a flow chart of the transmit task which uses the queues of the present invention.

FIGS. 6 and 7 show a flow charts of the receive and transmit task portions of the state machine 70. It is significant that in embodiments of the present invention all of the designated tasks and portions thereof, i.e., subtasks, are performed directly by the state machine 70 without any intervention by the processor 30. Operations depicted between the indicated dashed lines, i.e., the subtasks, are completed for a first channel by the state machine 70 and then the state machine 70 switches to the subtask pending for the next channel. After completing subtasks for all of the channels, eight channels in an exemplary embodiment, the state machine 70 resumes with the next pending subtask for the first channel. One of ordinary skill in the art should recognize that the state machine 70 is an implementation in logic functionally similar to a software driven multi-tasking executive. However, by forming the state machine 70 from digital logic instead of a software processor, performance advantages are achieved.

The receive task commences at block 130 where a packet descriptor is first allocated for channel x in block 132. The state machine then proceeds to the pending subtask for the next channel, e.g., x+1. After completing or skipping the pending subtask for the following channels, the state machine 70 inquires at block 134 whether the MAC for channel x is signalling that a portion of a data packet is available. If available, the DMA control logic 74 transfers this data portion, e.g., 128 bits, into the pack logic 78 in block 136. The pack logic 78 will then at block 138 transfer this data portion into the shared memory 24. The state machine 70 then determines whether (1) the end of the data packet (referred to as the end of frame (EOF) in this figure) is reached, (2) the end of a current fixed length buffer area (referred to as the end of buffer (EOB) in this figure) is reached, or (3) reception should continue into the current buffer.

The state machine 70 accordingly sets the pending substate for the current channel to block 140, 142 or 134, respectively, and then switches to the next channel. If the end of the current buffer is reached, a new buffer is allocated from the free buffer queue 88 in block 142 and its buffer pointer is stored in the current packet descriptor in block 144. Alternatively, if the end of the data packet is detected by the MAC for channel x, status is read from the MAC in block 140 and stored in the event queue 110 along with data designating the source LAN channel in block 146. Writing to the FIFO event queue 110 also generates the event interrupt signal 58, and this is the first time that the processor 30 is involved in the receive process.

Once a data packet transmission commences, data arrives at the MAC at an essentially constant rate. However, due to the task switching between multiple channels by the state machine 70, it should be apparent that data cannot be stored in shared memory 34 at this constant rate. However, embodiments of the present invention primarily overcome this situation by buffering a plurality of data bytes within each MAC in real time followed by a periodic data burst transfers by the DMA control logic 74 to the shared memory 24.

FIG. 7 shows a flow chart of the transmit task portion of the state machine 70. In embodiments of the present invention, this transmit task preferably only commences after data signifying a receive event is written to the event queue 110 and the processor 30 determines using the single source address table 28, according to the previously discussed criteria specified in IEEE 802.1(d), that a transmit task should be commenced. When the processor 30 determines that a received data packet should be transferred to another LAN, the processor 30 adds an entry to the XMT queue associated with that LAN. This entry to the XMT queue specifies a previously allocated packet descriptor corresponding to a received data packet in the packet descriptor queue 104. Once the processor 30 has made this entry into a single transmit queue, e.g., 116, (or in multiple XMT queues in cases requiring flooding), the transmit task is first delegated to the state machine 26 starting with block 148. With this delegation, the processor's task is essentially completed. However, the processor 30 does additionally update statistical information.

At block 148, the state machine 26 periodically tests for the presence of entries in the XMT queue, e.g., 116, for the channel being tested. As previously discussed, this test is performed by asking the queue logic 72 for a pointer, e.g., the read pointer 118, to the next entry in the XMT queue 116. However, should the associated read and write pointers, 118, 120, be equal, then a value is automatically returned which designates the absence of a XMT queue entry, e.g., a value with its MSB set to "0", and the subtask remains in block 148. If an entry is retrieved from the XMT queue, e.g., 116, the next subtask resumes at block 150 where the transmit descriptor is fetched and used to initialize the associated MAC and channel of the DMA control logic 74 in block 152.

The next subtask resumes at block 154 where the DMA control logic 74 determines if the MAC is ready to accept a character burst, e.g., 128 bits. If the MAC is ready, a character burst is read in block 156 from the current buffer, as determined by the packet descriptor pointed to in the transmit queue, using the DMA control logic 74 and the pack logic 78.

The subtask then continues in block 158 by using the DMA control logic 74 and the pack logic 78 to write the character burst to the MAC. This subtask then determines if (1) there is more data available in the current buffer, (2) the end of the current buffer (EOB) has been reached, or (3) if the end of the data packet (EOF) has been reached. If more data is available in the current buffer, the subtask continues processing in block 154 as previously described. Otherwise, the state machine 70 additionally determines whether the current buffer is the packet descriptor, e.g., 122, or a buffer, e.g., 94, pointed to by a pointer, e.g., 124, in the packet descriptor and then switches to the next subtask accordingly. If the end of the current buffer, e.g., 126, in the packet descriptor is reached, the subtask continues with subtask 164 which fetches the first buffer pointer, e.g., 124. If the end of the current (non packet descriptor) buffer is reached, the subtask normally continues at blocks 160 and 164 where reference to the current buffer is discarded (except in the case of flooding as described below) and a pointer to the next buffer, as identified by the XMT queue and its associated packet descriptor, is fetched to initialize the DMA control logic 74. Alternatively, if this was the last buffer allocated in the packet descriptor, the next subtask is block 162. In a special case, e.g., a minimum sized data packet, the end of a data block and the end of the data packet can be reached without allocating any additional buffers. In this case, processing proceeds from block 158 to 162 directly. Eventually, the end of the data packet (EOF) is reached and the XMT read pointer, e.g., 118, is incremented to deallocate the current transmit task in block 162.

Generally, the associated entry in the packet descriptor queue 104 is also deallocated in block 160 after each buffer is completed. However, in cases requiring flooding, i.e., when the received data packet is to be sent to a plurality of LANs, the packet descriptor queue entry is not deallocated until all of transmit tasks associated with that particular packet descriptor queue entry are completed. Using this technique avoids duplicating packet descriptors and buffers for each LAN, saving processing time and memory. This function is preferably accomplished for the exemplary packet descriptor 122 as follows. A count field (not shown) is retained within the packet descriptor 122 associated with each of the buffer pointer/status values 124. This count field is initially set to N−1 by the processor 30 in the case of flooding (or a value of 1 when the location of the destination device is known). Thereafter, each time block 160 (see detailed view of 160A–C) is executed, the associated count field is decremented at block 160A and only when the count field for that buffer is decremented to 0 is the buffer discarded at block 160B. Otherwise, the buffer is retained for use by other channels and processing continues at block 160C.

Figure 8:
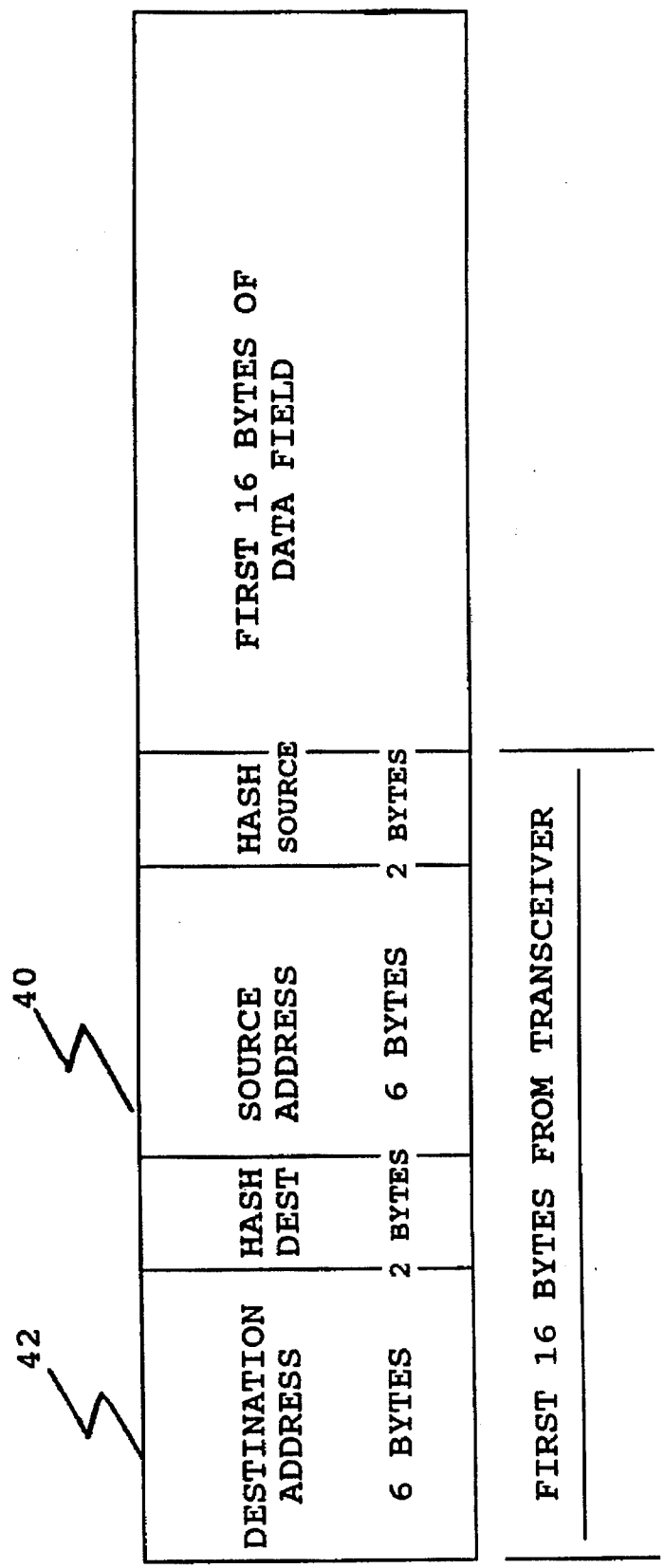
FIG. 8 shows an exemplary format for a portion of a received data packet with embedded hash values.

Embodiments of the present invention minimize the computation requirement on the processor 30 by allocating receive and transmit tasks to the control logic 26, thus permitting a single processor to maintain supervisory control over a plurality of LAN channels, all operating at full-wire speed. The processor's primary responsibility is to determine whether a received data packet should be transferred or discarded. Additionally, the processor 30 stores status information based on each received and transmitted data packet. As previously discussed, this determination is primarily made by referencing the destination address 40 of the received data packet 36 to the contents of the single source address table 28 which contains information identifying each known device, as identified by its source address 42 and its corresponding LAN channel. To expedite this reference to the source address table 28, a hashing algorithm is used as described in "Art of Computer Programming Volume 3 / Sorting and Searching" by Donald E. Knuth, which is incorporated herein by reference. Embodiments of the present invention preferably individually hash the source 40 and destination 42 addresses within the control logic 26 and embed corresponding hash, e.g., 2 byte, values within the received data packet stored in the shared memory 24. FIG. 8 shows an exemplary format for a first portion, e.g., 16 bytes, of a received data packet with embedded hash values. It is these hash values that the processor 30 then uses to improve access to the source address table 28. When a data packet is transferred via the control logic 26, the control logic 26 automatically performs a reciprocal operation by removing the embedded hash values, thus restoring the original format of the data packet for retransmission on a destination LAN.

In a commercial embodiment of the present invention, the control logic 26 is implemented from a field programmable gate array (FPGA). Upon initialization, the processor 30 executes code from a nonvolatile memory device (not shown), ROM, PROM, EPROM, EEPROM, Flash, etc., and uses a first section of data from this nonvolatile memory to generate a serial data stream that is used to configure the FPGA to form the control logic 26. Additionally, a second section of data from this nonvolatile memory is loaded into the shared memory 24 where it is subsequently executed by the processor 30 as its control software. The data is moved into the volatile shared memory 24, e.g., DEAM, since DRAM is more economical and faster than the nonvolatile memory, e.g., Flash memory, and thus capable of retrieving code for the processor 30 without requiring additional wait states. By using this same shared memory to store the control program for the processor 30, the source address table 28, the buffers, the queues and the packet descriptors, etc., the cost of embodiments of this invention can be minimized. While this description reflects a presently-preferred commercial embodiment, this particular structure is not considered to be a limitation of the present invention. For example, other envisioned embodiments can execute the control program for the processor 30 from an additional memory separate from the shared memory 24. Also, future commercial embodiments are envisioned in which the control logic 26 is fabricated with a custom logic device, i.e., a non-programmable device. It is believed that using a custom logic implementation of the control logic 26 will minimize future recurring costs.

Although the present invention has been described in detail with reference only to the presently-preferred embodiments, those of ordinary skill in the art will appreciate that various modifications can be made without departing from the invention. Accordingly, the invention is defined by the following claims.

I claim:

1. A switching apparatus for selectively bidirectionally transferring data packets between a plurality of local area networks (LANs), wherein said data packets identify destination and source addresses, said apparatus comprising:

a first media access controller (MAC) configured for receiving, transmitting and buffering data packets to a LAN; said first MAC associated with a first LAN for receiving and buffering a first set of data packets from said first LAN;

a second MAC associated with a second LAN for receiving and buffering a second set of data packets to said second LAN;

a shared memory comprised of a plurality of buffers adapted for storing said data packets from said first and second sets;

control logic for selectively storing each said received data packet from said first and second sets into at least one selected buffer;

a single source address table common to said first and second LANs for associating said source addresses to each said LAN; and a single processor executing a control program for forming said source address table in response to a single receive signal from said control logic and directing said control logic to discard or alternatively to transfer each stored data packet to a different LAN via its associated MAC according to the contents of said source address table and said stored data packets;

wherein said control logic comprises:

DMA control logic for bidirectionally transferring a plurality of bytes in bursts between said first and second MACs and said shared memory;

queue logic for forming a plurality of FIFO queue lists within said shared memory each containing a plurality of entries that are pointers to a plurality of said buffers within said shared memory; and a state machine for controlling reception and transmission of data packets between said first and second LANs and said shared memory using said DMA control logic according to said FIFO queue lists.

2. The switching apparatus of claim 1, wherein said state machine periodically executes portions of receive and transmit tasks for channels corresponding to each of said first and second LANs.

3. The switching apparatus of claim 1, wherein said FIFO queue lists comprise:

a first queue list wherein each entry in said first queue list corresponds to said buffers within said shared memory that are available for allocation;

a second queue list wherein each entry in said second queue list corresponds to an available descriptor adapted for defining one or more of said buffers that are allocated to store each said data packet;

a third queue list wherein each entry in said third queue list corresponds to each a received and stored data packet reported by said control logic to said processor; and fourth and fifth queue lists wherein each entry in said fourth and fifth queue lists corresponds to a received and stored data packet and a destination LAN for transmission by its associated MAC.

4. The switching apparatus of claim 3, additionally comprising means for transferring to a plurality of LANs a single data packet stored in a single set of buffers defined by a single entry in said second queue list when the source address identified by said data packet is not within said source address table.

5. The switching apparatus of claim 4, additionally comprising means for retaining said data packet stored in said single set of buffers until said data packet has been transferred to said plurality of LANs.

6. The switching apparatus of claim 1, wherein said control logic additionally comprises a memory interface unit for arbitrating access to said shared memory between said processor and said control logic.

7. The switching apparatus of claim 1, wherein said queue logic is comprised of a plurality of read and write pointer pairs, each said pointer pair pointing to a fixed-length queue list within said shared memory wherein each said entry in said queue list has a fixed-length.

8. The switching apparatus of claim 7, wherein:

one of said read and write pointers has a resolution of j bits corresponding to the size of said queue list and said queue logic generates k bits related to the size of each entry in said queue list; and means forming a pointer of j+k bits that directly addresses an entry in said queue list.

9. A switching apparatus for selectively bidirectionally transferring data packets between a plurality of local area networks (LANs) wherein said data packets identify source and destination addresses, said apparatus comprising:

a plurality of media access controllers (MACs) configured for receiving, transmitting and buffering data packets to a LAN, each coupled to a discrete LAN for receiving and buffering a portion of data packets transmitted across each said LAN;

a shared memory comprised of a plurality of buffers adapted for storing said data packets;

control logic means for allocating at least one buffer to each received data packet, fetching each portion of each said received and buffered data packet and storing each said portion;

a single source address table for associating said source addresses with each said LAN; and a single processor executing a control program for forming said source address table in response to a single receive signal from said control logic and directing said control logic to discard or alternatively to transfer each stored data packet to a different LAN via its associated MAC according to the contents of said source address table and said stored data packets;

wherein said control logic means additionally comprises:

a plurality of FIFO transmit queues each associated with one of said MACs comprised of queue data for specifying said stored data packets to be transmitted via said MACs to said LANs wherein said processor enters said queue data into said transmit queues in response to said source address table and said destination address of a data packet; and means to transfer each said specified stored data packet to a first MAC when said queue data is entered into said first transmit queue.

10. The switching apparatus of claim 9, wherein said transfer means uses direct memory access.

11. A switching apparatus for use in combination with a plurality of local area networks (LANs) for selectively transferring data packets between any pair of said LAN's wherein each of said data packets identifies a destination and a source address, said apparatus comprising:

a plurality of media access controllers (MACs) each configured for coupling to a different one of said LANs for receiving data packets therefrom and transmitting data packets thereto;

a shared memory;

control logic common to said LANs for selectively storing each data packet received by said MACs in said shared memory; said control logic comprising queue logic for selecting a portion of said shared memory for storing said data packets;

a source address table common to said LANs for associating each source address to one of said LANs; and a processor common to said LANs for forming said source address table in response to the source address of each stored data packet and alternatively directing said control logic to discard or transfer each stored data packet to one of said LANs via its associated MAC according to the contents of said source address table and said destination address of each stored data packet.

12. The switching apparatus of claim 11, wherein said shared memory is comprised of a plurality of buffers adapted for storing data packets.

13. The switching apparatus of claim 12, wherein each said buffer has a fixed length smaller than a maximum data packet size such that a plurality of said buffers are required to store a data packet having said maximum data packet size.

14. A switching apparatus for use in combination with a plurality of local area networks (LANs) for selectively transferring data packets between any pair of said LANs wherein each of said data packets identifies a destination and a source address, said apparatus comprising:

a plurality of media access controllers (MACs) each configured for coupling to one of said LANs for receiving data packets therefrom and transmitting data packets thereto;

a shared memory comprised of a plurality of buffers adapted for storing said data packets;

control logic common to each of said LANs for selectively storing each data packet received from one of said MACs in said shared memory; said control logic comprising queue logic for allocating at least one buffer to each received data packet;

a source address table common to each of said LANs for associating each said source address to one of said LANs; and a processor common to each of said LANs for forming said source address table in response to the source address of each stored data packet and alternatively directing said control logic to discard or transfer each stored data packet to one of said LANs via its associated MAC according to the contents of said source address table and said destination address of each stored data packet.

15. The switching apparatus of claim 14, wherein each said buffer has a fixed length smaller than a maximum data packet size such that a plurality of said buffers are required to store a data packet having said maximum data packet size.

16. The switching apparatus of claim 15, wherein said control logic additionally comprise means to transfer a selected received data packet stored in a plurality of said buffers to a selected one of said MACs.

17. The switching apparatus of claim 14, wherein said apparatus is comprised of at least four MACs for transferring data packets between at least four discrete LANs.

18. The switching apparatus of claim 14, wherein said processor executes a control program and said control program and source address table are contained within said shared memory.

19. A method of selectively transferring data packets between a plurality of local area networks (LANs) wherein each of said data packets identifies a destination and source address, comprising the steps:

receiving a first data packet from a first LAN using a first media access controller (MAC);

allocating at least one fixed length buffer from a shared memory using queue logic common to each of said LANs;

storing said first data packet in said at least one buffer allocated by said queue logic using control logic common to each of said LANs;

notifying a processor common to each of said LANs that said data packet is stored in said at least one buffer;

determining a destination LAN according to the destination address of said first data packet and a single source address table which associates each destination address to one of said LANs;

passing data to said control logic identifying said at least one buffer and said destination LAN if said destination LAN is not said first LAN; and transferring said first data packet from said at least one buffer to a second MAC coupled to said destination LAN using said control logic.

20. The method of claim 19, additionally comprising the step of updating the contents of said source address table by said processor in response to said source address of said first data packet.

21. The method of claim 19, additionally comprising the step of allocating a second buffer using said queue logic when the first data packet exceeds the length of said first buffer.

22. The method of claim 19, additionally comprising the steps of:

receiving status information from said first MAC in response to said first data packet;

associating said status information to said first data packet using said control logic; and retrieving said status information and updating statistics maintained by said processor.

* * * * *